(12) United States Patent
Engle

(10) Patent No.: US 7,516,044 B2
(45) Date of Patent: Apr. 7, 2009

(54) SELF DIAGNOSING HVAC ZONE CONFIGURATION

(75) Inventor: Aaron Engle, Huntertown, IN (US)

(73) Assignee: Carrier Corporation, Farmington, CT (US)

( * ) Notice: Subject to any disclaimer, the term of this patent is extended or adjusted under 35 U.S.C. 154(b) by 639 days.

(21) Appl. No.: 10/951,533

(22) Filed: Sep. 28, 2004

(65) Prior Publication Data

US 2006/0074596 A1   Apr. 6, 2006

(51) Int. Cl.
G06F 11/30 (2006.01)
G06F 15/00 (2006.01)
G21C 17/00 (2006.01)

(52) U.S. Cl. .................. 702/183; 702/99; 702/189; 700/17; 700/32; 700/81; 700/278; 361/65; 361/115

(58) Field of Classification Search ............ 702/99, 702/183, 185, 188; 700/32, 78–81, 276–278, 700/17, 19, 26; 379/102.05; 340/3.1, 635; 361/65–67, 71, 93.2, 115, 189, 211
See application file for complete search history.

(56) References Cited

U.S. PATENT DOCUMENTS

| | | | |
|---|---|---|---|
| 4,630,670 A | | 12/1986 | Wellman et al. |
| 5,289,362 A | * | 2/1994 | Liebl et al. ............... 700/22 |
| 5,485,343 A | * | 1/1996 | Santos et al. ............. 361/115 |
| 5,801,940 A | * | 9/1998 | Russ et al. ................ 700/9 |
| 6,292,717 B1 | * | 9/2001 | Alexander et al. ......... 700/293 |
| 6,456,473 B1 | * | 9/2002 | Olson ..................... 361/91.1 |
| 2005/0125083 A1 | * | 6/2005 | Kiko ..................... 700/19 |

OTHER PUBLICATIONS

Bon-Eon et al., 'Introduction of Haenam-Jeju HVDC System', 2001, IEEE Publication, pp. 1006-1010.*
Ngo et al., 'Automatic Commissioning of Airconditioning Plant', Sep. 1998, IEEE Publication, pp. 1694-1699.*
Sinnamohideen, 'Discrete-Event Diagnostics of Heating, Ventilation, and Air-Conditioning Systems', 2001, IEEE Publication, pp. 2072-2076.*
Shaw et al., 'Detection and Diagnosis of HVAC Faults Via Electrical Load Monitoring', Jan. 2002, HAVAC Research, vol. 8, No. 1, pp. 13-40.*
Microbus, 'MAT 891 Sigle Slot SBC 266 MHz Pentium Processor 500MHz AMD K6-3', 1999, pp. 1-2.*

* cited by examiner

Primary Examiner—Eliseo Ramos Feliciano
Assistant Examiner—Elias Desta
(74) Attorney, Agent, or Firm—Marjama Muldoon Blasiak & Sullivan LLP

(57) ABSTRACT

In a drive circuit in which a plurality of drive motors are connected to a power source through a protective device which trips when the flow of current is excessive, provision is made to detect which circuit or circuits were active at the time of the failure. A microprocessor is provided to both control the activation of each of the various circuits and to also sense which circuits were active at the time of the failure. Appropriate signals are sent from the microprocessor to a user interface so that proper diagnostic and repair action can be taken.

11 Claims, 3 Drawing Sheets

US 7,516,044 B2

SELF DIAGNOSING HVAC ZONE CONFIGURATION

BACKGROUND OF THE INVENTION

This invention relates generally to air conditioning systems and, more particularly, to a method and apparatus for diagnosing faults in such a system having multiple drive motors.

As improved design and operational procedures for heating, ventilation and air conditioning (HVAC) systems are continually being provided for the benefit of users, such systems are typically becoming more complex and difficult to install and maintain. Among some of the difficulties that occur are improper wiring of the various components and the related problems which are difficult to diagnose in complex HVAC systems. For example, in a multi-zone system, wherein it is desirable to introduce varying degrees of cooling or heating to various zones in a building, a plurality of drive motors are connected to position their respective dampers in a desired position so as to regulate the degree of cooling/heating in their particular zones. In the event that one of the damper drive motors is connected improperly, a fault will occur in the system, but it is difficult to determine exactly where that fault has occurred. Accordingly, the diagnosis and repair of the problem can be unduly complicated.

One such system is a variable volume multizone system as shown and described in U.S. Pat. No. 4,630,670 assigned to the assignee of the present invention. That patent is incorporated herein by reference. As will be seen, both the fan speed and the respective damper positions are selectively varied to obtain the desired temperatures in the various zones. Other similar systems maintain a constant fan speed while varying the damper positions by individual motor control.

SUMMARY OF THE INVENTION

Briefly, in accordance with one aspect of the invention, a protective circuit, which is adapted to trip when the current therethrough exceeds a predetermined level, is connected in parallel with the plurality of devices that are individually powered on a selective basis by an interconnected control system. When the protective device trips because of excessive power, the control system determines which device was receiving power at the time that the device tripped. This information is then provided to the user for diagnosing and repairing the problem.

In accordance with another aspect of the invention, the current protection device is of the self-healing type wherein the device resets itself after a predetermined time period, with current then being restored to the operating system. In particular, a poly thermal crystal (PTC) device is provided for this purpose.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
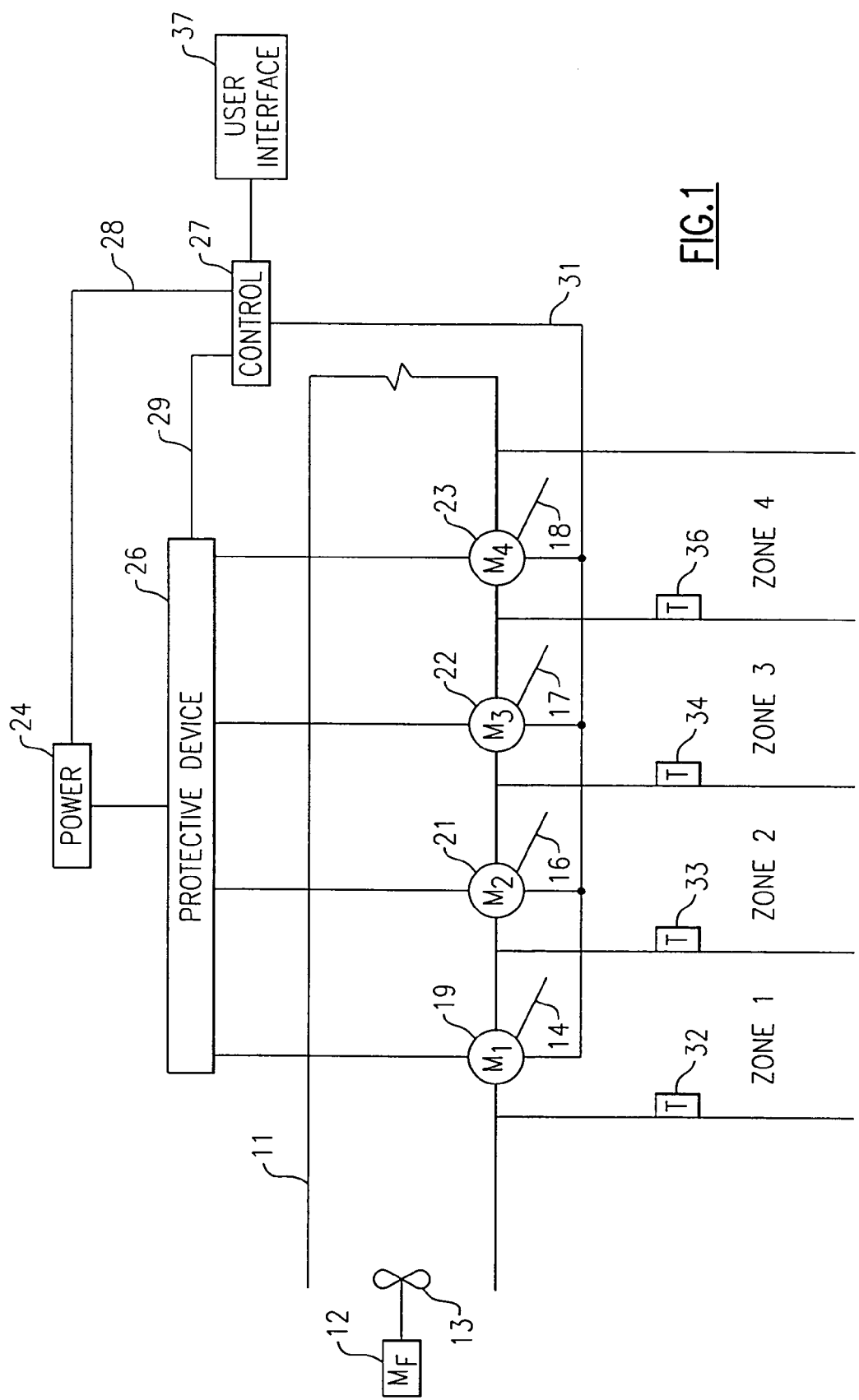
FIG. 1 is a schematic illustration of a multi zone comfort system with the present invention incorporated therein.

Referring now to FIG. 1 there is shown a simplified schematic illustration of a comfort system incorporating the present invention. A duct 11 carries conditioned air that is caused to flow by the motor 12 and associated fan 13, with the duct 11 extending over the four zones, Zone 1, Zone 2, Zone 3 and Zone 4. The zones have respective dampers 14, 16, 17 and 18, driven by respective motors 19, 21, 22 and 23. The amount of air flowing to respective zones is therefore dependent on the degree of openness of the respective dampers, and those positions are adjusted by operation of the respective motors which receive their power from a power source 24 by way of a protective device 26, one form of which may be a polythermal crystal (PTG). A control apparatus 27 receives power from a power source 24 by way of line 28 and communicates with the protective device 26 by way of line 29. The control 27 is also connected to the individual damper motors 19, 21, 22, and 23 by way of line 31.

In operation, power is selectively connected, as determined by the control 27, to one or more of the damper motors 19, 21, 22, or 23 by way of the protective device 26, for the purpose of meeting the individual demands of the respective zones. Thermostats 32, 33, 34 and 36 are provided in the respective zones to sense the existing temperature and compare it with a desired temperature in the respective zones.

If, at any time, the current flowing through the protective device 26 exceeds a predetermined level, the device 26 will trip and disconnect the power to the motor(s) that happens to be operating at that time. The control 27 will then determine which motor(s) was operating at the time that the device 26 was tripped and will provide an indication thereof to the user interface 37. The user can then use this information to diagnose and repair the fault which caused the device 26 to trip out as will be described hereinafter.

Figure 2:
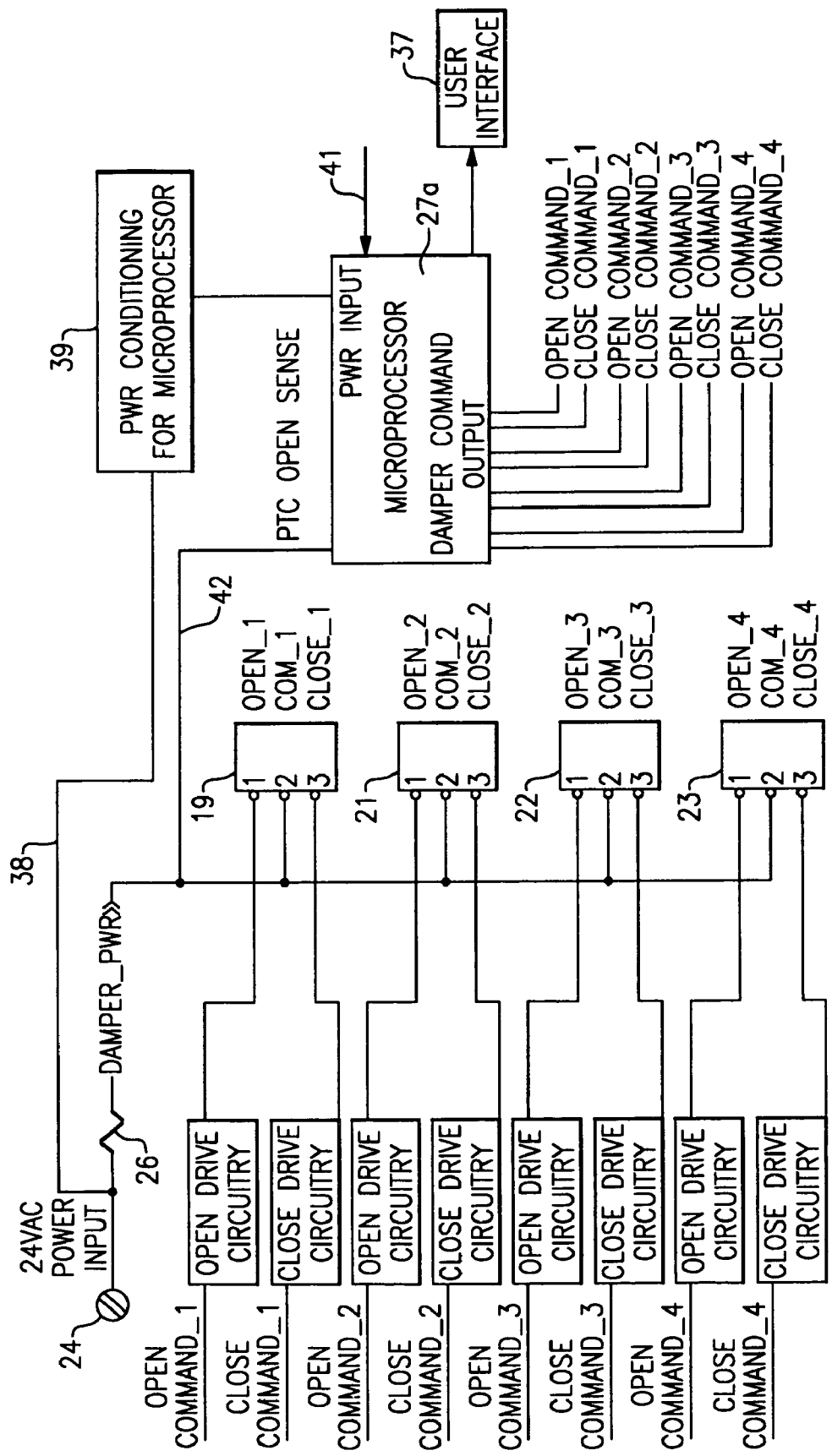
FIG. 2 is an electrical circuit diagram of the system in accordance with the present invention.

Referring now to FIG. 2, the circuitry is shown to include a 24 volt AC power input 24 providing power to the control apparatus 27 which is in one form a microprocessor 27a, by way of line 38 and a power conditioning module 39. Power is also provided by way of the protective device 26 to the various damper drive motors 19, 21, 22, and 23.

The microprocessor 27a, in response to other control signals received along line 41, such as, for example, the signals from the respective thermostats, operates to send open or close command signals to the respective drive circuitry for the purpose of moving the dampers to a more open or closed position by way of a respective drive motors. Feedback data then passes along line 42 to inform the microprocessor 27a of the condition of the respective circuits.

Assuming now that excess current flow has caused the PTC to temporarily open the circuit. The microprocessor 27a will then be able to determine, from feedback received along line 42, which of the four circuits (those involving drive motors 19, 21, 22, and/or 23), were operating at the time of the failure. This information can then be provided to the user interface 37 so that corrective action can be taken. After a specified period of time, the PTC will reset itself and, thus, after corrective action has been taken on the basis of information provided to the user interface 37, power will be resumed to the circuits as shown in FIG. 2. If the same conditions still exist, the protective device will again break and the process will be repeated, with diagnostic information again being sent to the user interface 37. A memory is preferably provided in the microprocessor 27a and/or the user interface 37 such that the performance history will be retained in the memory such that this data can be used in diagnosing problems in the future.

Figure 3:
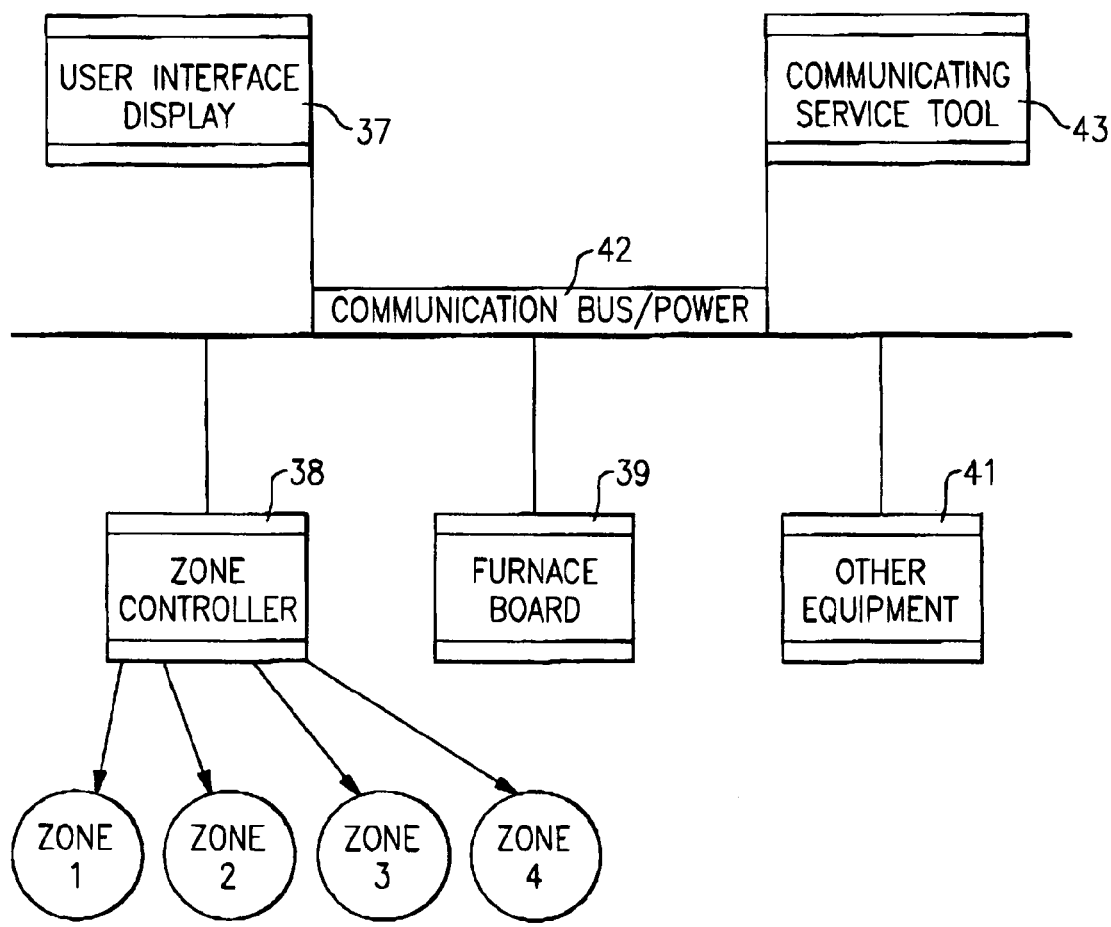
FIG. 3 is a schematic illustration of the present invention as incorporated into various types of comfort or other systems.

Referring now to FIG. 3, the diagnostics portion of the present system is shown. The system is capable of using a communication protocol to show the serviceman what, if any, faults are in the system. As shown in FIG. 3, the User Interface 37, is a graphical interface, which will indicate to the user/serviceman in both code number and short description as to where the fault is located. Should a fault occur in said system such as is in the Zone Controller 38 as described hereinabove, in a Furnace Board 39 of a heating system, or in any other Equipment 41 that may be appropriate, the present system would report this fault to the User Interface 37 and then the user would have access to the data through a visual report by means of the aforementioned text description and fault code. Instructions to call service professional may also appear on the users screen to direct the user to seek assistance with the provided number on the screen.

If a serviceman runs a diagnostics on the system through the communication bus 42, he will be able to evaluate system performance and determine the condition of the operation which have generated the faults. This repair/servicing is made more efficient through the means of detailed fault indicators that can be read through the graphical interface of the communicating Service Tool 43 which connects to the bus 42 and runs diagnostics on the system.

While the present invention has been particularly shown and described with reference to a preferred embodiment as illustrated in the drawings, it will be understood that one skilled in the art that various changes in detail may be affected therein without departing from the spirit and scope of the invention as defined by the claims.

I claim:

1. A diagnostic apparatus for determining the location of a fault in a comfort system having power selectively delivered to individual devices among a plurality of devices, comprising:
    a current protective device connected in parallel between a power source and the plurality of devices, said protective device being adapted to trip when a current level therethrough exceeds a predetermined level;
    a control device connected to both said protective device and to the plurality of devices for selectively directing power from said protective device to operate at least one of said plurality of devices at a time;
    means for sensing, when said protective device is tripped, which of said at least one device was operating at that time; and
    means for providing an indication thereof for purposes of diagnostics and repair wherein said current protective device is a self-healing fuse.

2. A diagnostic apparatus as set forth in claim 1 wherein said self-healing fuse is a poly thermal crystal.

3. A diagnostic apparatus as set forth in claim 1 wherein said sensing means is integral with said control device.

4. A diagnostic apparatus as set forth in claim 1 wherein said means for providing an indication is by way of a user interface display.

5. A method of diagnosing faults in a comfort system having power deliverable to a plurality of devices in individual circuits, comprising the steps of:
    installing a current protective device in parallel between a power source and the plurality of devices, said protective device being adapted to trip when a current level therethrough reaches a predetermined level;
    providing a control for selectively switching power from said protective device to operate at least one individual device among the plurality of devices;
    when said protective device trips, sensing which of said at least one device was operating at that time; and
    providing an indication thereof for purposes of diagnostics and repair wherein said current protective device is a self-healing fuse.

6. A method as set forth in claim 5 wherein said self-healing fuse is a poly thermal crystal.

7. A method as set forth in claim 5 wherein said indication providing step is provided by a user interface display.

8. A diagnostic apparatus for determining the location of a fault in a comfort system having power selectively delivered to individual devices among a plurality of devices, comprising:
    a current protective device connected in parallel between a power source and the plurality of devices, said protective device being adapted to trip when a current level therethrough exceeds a predetermined level;
    a control device connected to both said protective device and to the plurality of devices for selectively directing power from said protective device to operate at least one of said plurality of devices at a time; and
    a sensor which, when said protective device is tripped, determines which of said at least one device was operating at that time wherein said current protective device is a self-healing fuse.

9. A diagnostic apparatus as set forth in claim 8 wherein said self-healing fuse is a poly thermal crystal.

10. A diagnostic apparatus as set forth in claim 8 wherein said sensor is integral with said control device.

11. A diagnostic apparatus as set forth in claim 8 and including an interface display that receives a signal from said sensor to provide an indication to an operator.

* * * * *